United States Patent
Weber et al.

[11] 3,919,575
[45] Nov. 11, 1975

[54] VIBRATOR GENERATOR

[75] Inventors: Johannes Weber, Magstadt; Wolfgang Schneider, Leinfelden, both of Germany

[73] Assignee: Robert Bosch G.m.b.H., Stuttgart, Germany

[22] Filed: Sept. 19, 1974

[21] Appl. No.: 507,622

[30] Foreign Application Priority Data
Oct. 3, 1973 Germany.................... 7335748[U]

[52] U.S. Cl. ............ 310/81; 128/36; 259/DIG. 42
[51] Int. Cl.² ......................................... H02K 7/10
[58] Field of Search ......... 310/81, 80, 66, 252, 253; 128/36, 35, 34; 259/72, DIG. 42

[56] References Cited
UNITED STATES PATENTS

| | | | |
|---|---|---|---|
| 1,630,115 | 5/1927 | Duprey | 128/36 |
| 2,854,594 | 9/1958 | Philippovic | 310/81 |
| 3,138,813 | 6/1964 | Kaplan | 128/35 |
| 3,580,246 | 5/1971 | Foreman | 128/36 |
| 3,585,990 | 6/1971 | Blanchly | 128/36 |
| 3,757,148 | 9/1973 | Philibert | 310/81 |

Primary Examiner—R. Skudy
Attorney, Agent, or Firm—Michael S. Striker

[57] ABSTRACT

A vibration generator, particular suited for use with vibratory conveyors and vibratory screens, has an electric motor on the rotary output shaft of which there is mounted a member constituting an imbalanced mass. This member rotates with the output shaft. A second member constituting another imbalanced mass is mounted on a crank pin which is eccentric to the output shaft; the second member can turn relative to the first member about the crank pin. A torsion spring or an analogous component connects the two members with one another so that the second member can turn relative to the first member against the resilient resistance of the torsion spring.

7 Claims, 3 Drawing Figures

VIBRATOR GENERATOR

BACKGROUND OF THE INVENTION

The present invention relates to a vibration generator which is particularly but not exclusively suited for use with vibratory conveyors and vibratory screens.

Vibration generators for use with vibratory conveyors, vibratory screens and other equipment to which vibration must be imparted, are already known. Generally speaking, these devices are reasonably satisfactory. However, they suffer from the disadvantage that heretofore it has not been possible to permit a continuous variation or adjustment of the vibratory forces during operation of the equipment.

SUMMARY OF THE INVENTION

It is, accordingly, a general object of the present invention to provide a vibration generator which avoids the disadvantages of the prior art.

More particularly, it is an object of the present invention to provide an improved vibration generator which makes it possible during its operation to provide for a continuous variation or adjustment of the vibratory forces resulting from the operation of the generator.

Another object of the invention is to provide such an improved vibratory generator which is very simple in its construction and highly reliable in its operation.

In keeping with these objects, and with others which will become apparent hereafter, one feature of the invention resides in a vibration generator, particularly suitable for use with vibratory conveyors in vibratory screens, which briefly stated comprises a power unit having a rotary output shaft, a pair of members constituting respective imbalanced masses, and means connected with these members. The one member is fixedly mounted on the rotary output shaft of the power unit for rotation therewith, and the other of the members is turnable relative to the one member in response to rotation of the output shaft. The means which is connected with both of the members resiliently yieldably resists the turning of the other member relative to the one member.

It is particularly advantageous if the two members are connected with one another by a crank pin, in particular by a crank pin on which the other member is turnably mounted and which crank pin has its axis eccentric but parallel to the axis of the output shaft.

It is also advantageous if the resiliently yieldable means is a torsion spring surrounding the crank pin and having two arms which are connected with the respective members. The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
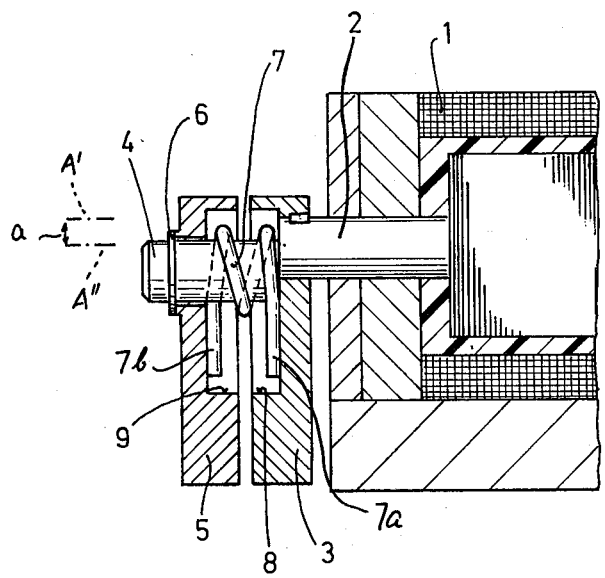
FIG. 1 is a fragmentary axial section through a vibration generator according to the present invention.
Figure 2:
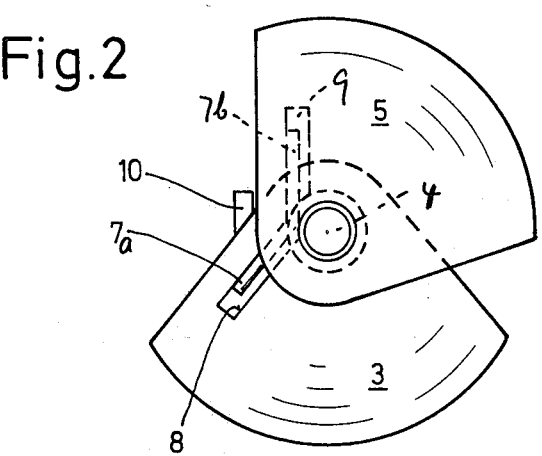
FIG. 2 is an end view of the vibration generator in FIG. 1, looking towards the right, and showing only the imbalanced masses in one operating position.
Figure 3:
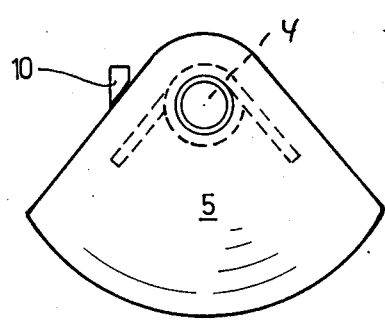
FIG. 3 is a view similar to FIG. 2, but showing the imbalanced masses in a different operating position.

DESCRIPTION OF THE PREFERRED EMBODIMENTS:

Referring now to the drawing in detail, where FIGS. 1–3 illustrate one embodiment of the invention, it will be seen that in FIG. 1 the power unit of the novel vibration generator is shown only fragmentarily and diagrammatically in form of an electromotor 1 having an output shaft 2. In FIGS. 2 and 3 the power unit 1 has been omitted entirely for the sake of clarity, but its location will be readily understood inasmuch as FIGS. 2 and 3 are end views of FIG. 1, looking towards the right in that Figure. It will be appreciated that in order to obtain maximum versatility of the vibration generator the motor 1 should be of the type whose rotations per minute can be varied, that is it should be a variable output electromotor, for instance a thyristor-controlled three phase motor. In view of the vibrations which will be transmitted to it from the imbalanced masses the motor should preferably be constructed with heavy-duty bearings, or should be provided with additional bearings for the output shaft 2. However, this is of course understood.

A first member 3 constituting one imbalanced mass is fixedly mounted on the output shaft 2 for rotation with the same. This can be done by providing a key or similar arrangement by means of which the member 3 is mounted on the shaft 2 so that it can rotate with but not relative to the same. A crank pin 4 is provided in this embodiment, having its axis A'' eccentrically offset with reference to axis A' of the output shaft 2, the amount of offset being identified by reference character a. The crank pin 4 is of course fixedly connected either with the shaft 2 or with the member 3 so that it will also rotate with shaft 2 and the member 3 when shaft 2 is made to turn. Mounted on the crank pin 4 is a second member 5 constituting a second imbalanced mass. The member 5, however, is so mounted on the crank pin 4 that it can turn relative to the same and also relative to the first member 3. A circlip 6 or similar component is used to prevent the member 5 from slipping off the crank pin 4.

A torsion spring 7 surrounds the crank pin 4 intermediate the members 3 and 5. The members 3 and 5 have juxtaposed surfaces which are formed with recesses 8 and 9, respectively. The torsion spring 7 has two arms 7a and 7b which are respectively received in the recesses 8 and 9 whose configuration can be more clearly seen in FIG. 2. Thus, the torsion spring 7 is connected with the two members 3 and 5 and resiliently but yieldably resists any turning movement of the member 5 about the crank pin 4 relative to the member 3. An abutment 10, shown in FIGS. 2 and 3 but omitted for the sake of clarity in FIG. 1, is provided on the member 3 and projects into the path of turning movement of the member 5 so as to limit the turning movement of the member 5 relative to the member 3. The torsion spring 5 is mounted in place with a certain prestress, in such a manner that in the stationary position of the shaft 2 it urges the member 5 to assume relative to the member 3 the position that is illustrated in FIG. 2.

When the novel vibration generator is to be operated, the electromotor 1 is energized and the shaft 2 begins to turn. Up to a certain rpm of the output shaft 2, the members 3 and 5 will remain in the relative position that is shown in FIG. 2 in which the vibratory forces produced by the imbalanced masses represented by the members 3 and 5 are relatively small. However, because the effective line of the centrifugal force acting upon the member 5 does not pass through the axis of rotation of the member 5, which coincides with the axis A″ of the crank pin 4, this centrifugal force produces a moment which acts upon the member 5 and turns about the crank pin 4. This moment attempts to move the member 5 away from the abutment 10 against which the member 5 is normally urged by the spring 7. As such movement away from the abutment 10 takes place, due to the turning of the member 5 about the crank pin 4, the vibratory forces resulting from the two imbalanced masses represented by the members 3 and 5 continuously increase because the components of the centrifugal forces of the two imbalanced masses 3 and 5 which act along the same line, but in mutually opposite directions, become increasingly smaller. The relative turning movement of the member 5 with reference to the member 3 comes to an end when the torque acting upon the member 5 is in equilibrium with the counterforce produced by the spring 7. For a different rpm of the vibration generator, this equilibrium will differ. When the rpm is further increased, the member 5 will finally move to the position shown in FIG. 3 in which it is in precise registry with the member 3 and in which the vibration generator produces the maximum vibrations of which it is capable, because the centrifugal forces of the two members 3 and 5 act in a single direction and along a single effective line.

The behavior of the member 5 in response to a change in the rpm of the shaft 2 can be influenced by changing the dimension $a$, changing the eccentricity of the axis A″ with reference to the axis A′, changing the characteristic line of the spring 7 and changing the masses 3, 5 themselves. It is also possible, of course, to use more than two of these masses, that is to use more than two of the members 3, 5. It is also possible to use an elastic resilient component other than the illustrated torsion spring 7.

By appropriate selection or variation of one or more of the aforementioned criteria an adjustment of the vibratory forces produced by the novel vibration generator can be obtained within a precisely selective and predetermined rpm range.

It is clear that the vibration generator according to the present invention overcomes the disadvantages of the prior art, as outlined at the beginning of this specification, and makes possible a continuous adjustment of the vibratory forces produced during its operation. Furthermore, it is equally clear that the vibration generator according to the present invention is extremely simple in its construction and very reliable in its operation. Moreover, by a simple exchange of the elastically yieldable component, that is the spring 7 or its equivalent, for a component having a different characteristic, the vibration generator according to the present invention can readily be accommodated to different requirements that may be encountered in actual use.

It will be understood that each of the elements described above, or two or more together, may also find a useful application in other types of constructions differing from the types described above.

While the invention has been illustrated and described as embodied in a vibration generator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

1. A vibration generator, particularly for use with vibratory conveyors and vibratory screens, comprising a power unit having rotary output shaft; a pair of members constituting respective imbalanced masses, one of said members being fixedly mounted on said shaft for rotation therewith and the other of said members being turnable relative to said one member in response to rotation of said shaft; a crank pin having an axis which extends parallel but is eccentric relative to the axis of said output shaft, said other member being turnably mounted on said crank pin; and means connected with said members and resiliently yieldably resisting the turning of said other member relative to said one member, said means comprising a torsion spring surrounding said crank pin and having a pair of arms each of which engages one of said members.

2. A vibration generator as defined in claim 1, wherein said members have respective juxtaposed surfaces, each provided with a recess into which one of said arms of said torsion spring extends.

3. A vibration generator as defined in claim 1; and further comprising abutment means operative for limiting the turning of said other member relative to said one member.

4. A vibration generator as defined in claim 3, wherein said abutment means comprises an abutment portion projecting from said one member.

5. A vibration generator, particularly for use with vibratory conveyors and vibratory screens, comprising a power unit having a rotary output shaft; a pair of members constituting respective imbalanced masses, one of said members being fixedly mounted on said shaft for rotation therewith and the other of said members being turnable relative to said one member in response to rotation of said shaft; and means connected with said members and resiliently yieldably resisting the turning of said other member relative to said one member.

6. A vibration generator as defined in claim 5; further comprising a crank pin having an axis which extends parallel but is eccentric relative to the axis of said output shaft, said other member being turnably mounted on said crank pin.

7. A vibration generator as defined in claim 5, wherein said power unit is an electromotor.

* * * * *